United States Patent [19]

Gueussier

[11] 4,089,681
[45] May 16, 1978

[54] PROCESS FOR THE MANUFACTURE OF STEEL PRODUCTS

[75] Inventor: André Louis Gueussier, Persan-Beaumont, France

[73] Assignee: Cefilac, Paris, France

[21] Appl. No.: 765,409

[22] Filed: Feb. 3, 1977

[30] Foreign Application Priority Data

Feb. 3, 1976 France .............................. 76 03538

[51] Int. Cl.$^2$ ............................................. C22B 5/10
[52] U.S. Cl. ....................................... 75/133.5; 75/3; 75/37; 75/129; 29/420.5
[58] Field of Search ........................ 75/214, 3, 32–38, 75/129, 133, 133.5; 29/420.5

[56] References Cited

U.S. PATENT DOCUMENTS

| 2,290,734 | 7/1942 | Brassert .................................. 75/37 |
| 2,792,302 | 5/1957 | Mott ....................................... 75/214 |
| 2,839,397 | 6/1958 | Cavanagh ............................... 75/33 |
| 3,201,228 | 8/1965 | Grebe et al. ............................ 75/33 |
| 3,796,563 | 3/1974 | Wieland, Jr. et al. ................. 75/214 |
| 3,823,009 | 7/1974 | Lailach et al. ......................... 75/3 |

Primary Examiner—M. J. Andrews

[57] ABSTRACT

The invention relates to a process for manufacturing products such as bars, sections, strips, weldless tubes made of ordinary or alloyed steel, starting from an iron ore, without passing through the liquid state.

This process consists in:
  a pre-reduced concentrated iron ore with a non-reducible oxide content of less than 1% is prepared,
  a homogeneous mixture of this ore is made with a lubricant, a binder and a carbonized reducer,
  a slab of this mixture is compacted and a complete reduction is carried out on this compacted slab under a neutral or reducer gas flow of between 1100° and 1350° C in order to obtain a porous steel slab,
  the hot slab leaving the furnace is transformed by extrusion, rolling or forging.

The invention enables products of accurate analysis to be obtained with simplified installations of average capacity.

11 Claims, No Drawings

PROCESS FOR THE MANUFACTURE OF STEEL PRODUCTS

The present invention relates to a process for the manufacture of products such as bars, sections, seamless tubes, strips, etc., made of ordinary steel or of alloyed steels, starting from iron ore and without passing the liquid state.

At present the two principal channels used in the production of steel are, on the one hand, the blast furnace combined with the converter, which uses iron ore, usually enriched, as base material and which leads to high production units and, on the other hand, the arc furnace which generally uses scrap iron, which is mainly used for special steels and leads to less units. For some years, the two channels, but particularly the second one, have also been using pre-reduced ore in which the reduction of the oxides generally leads to a metal rate of between 75 and 95% inclusive.

Whichever channel is chosen, the metal is cast in the liquid state, either in ingots which are then transformed into semi-finished products by hot rolling, or directly into semi-finished products by continuous casting.

As well as the classical methods, steel has also been manufactured without passing through the liquid state in particular from either metallic powders or recycled scrap iron.

The iron or steel powders, manufactured by atomisation from a liquid jet or by reduction of very pure ores, are generally subjected to an annealing and reducing heat treatment in a hydrogen atmosphere then sintered and transformed into bars or into items by forging. This method, which is applicable to numerous metals and alloys is currently used for the production of metals with a high melting point such as beryllium, molybdenum or tungsten or of certain metal carbides.

The scrap iron may also be used to manufacture steel without passing through the liquid state. The scraps of selected shape such as chips, sheet iron waste etc., are, after a preparatory treatment designed to rid them of dust, paint, oxides etc., compressed into slabs and, after non-oxidising heating, may be transformed into commercial products by forging or extrusion. This operation may be simplified by placing the compacted scraps inside a welded and sealed steel envelope. This method is dependent upon recycling, the products obtained having practically the average analysis of the starting products, which must be chosen and prepared with great care.

However, none of these methods of production of steel in the solid state permits the direct use of normal iron ore produced by the mines to manufacture a steel of given analysis. Up until now, the iron ore has been reserved for the manufacture of steel by the liquid method because, even after enrichment, it normally contains a certain quantity of non-reducible oxides coming from the gangue, which cause inclusions. An enriched or even super-concentrated ore often contains from 5 to 10% of non-reducible oxides, and ores in which this content is less than 2% are rarely found.

The aim of the present invention is to enable products of ordinary or alloyed steel of a given analysis to be directly manufactured, without passing through the liquid state, by using the normal enriched ore produced by the mines as base starting material, preferably selecting an ore with a non-reducible oxide content not exceeding 10% and with a phosphorous content of 0.05%.

By eliminating the liquid state, numerous processes such as smelting, casting, rolling of blooms of billets, cleaning etc., are eliminated and this leads to savings in investment, energy, manufacturing costs, and an improvement in the yield. In addition, the present invention leads to high quality products having a precise analysis and an excellent homogeneity of properties in "length" and in "width" as well as in the surface and the core or over the entire length of the product.

Finally, the present invention enables manufacturing units of average capacity (a few dozen to some hundred thousand tons per year) which are easily automised to be created, producing high quality products at competitive prices and being adapted for installation both near consumer areas and near the ore production areas.

According to the invention, the manufacturing process for products such as bars, tubes, sections, and strips from a normal enriched iron ore without passing through the liquid state comprises the following operations:

(a) a pre-reduced concentrated iron ore in powder form whose non-reducible oxide content is less than 1% is prepared;

(b) a homogeneous mixture of this ore is made with a lifting lubricant, a carbonised reducer in powder or liquid form and optionally a binding agent;

(c) a solid or hollow billet of this mixture is compacted cold or tepid;

(d) the compacted billet is placed in a furnace at a temperature of between 1,100° and 1,350° C inclusive, under a neutral or reducing gas current, in such a way as to allow it to reduce completely into a non-oxidised porous steel billet;

(e) the hot billet leaving the furnace is transformed by extrusion, rolling or forging in such a way as to obtain the desired product.

According to one of the characteristics of the process according to the invention, a pre-reduced concentrated iron ore having a non-reducible oxide content of less than 1% is prepared by:

crushing a normal type of enriched iron ore having a granulometry which is less than the liberating mesh, in such a way that each of the grains has a single mineralogic entity, pre-reducing the crushed ore in the form of powder or of pellets, crushing the pre-reduced ore to a granulometry which is less than or equal to that of the ore before pre-reduction, enriching by magnetic separation at low intensity.

The pre-reducing operation takes place in the classical way, either with carbon or with gasses, that is:

either pre-reduction of the ore which is agglomerated into pellets in a shaft furnace by a gaseous $CO + H_2$ reducer obtained by reforming the natural gas or the fuel at a temperature of between 700° and 850° C inclusive, or pre-reduction of the powdered ore by fluidisation in a current of the reducing $CO + H_2$ mixture at a temperature of between 500° and 800° C inclusive, or pre-reduction of the ore which is agglomerated in pellets by the coal (anthracite or lignite) in a rotating furnace at a temperature of between 1000° and 1100° C inclusive.

This pre-reduction is incomplete and, according to the ores, only 75 to 95% of the iron is reduced to the metallic state.

The pre-reduction does not change the iron oxide grains which are completely or partially transformed into iron. Crushing to the initial granulometry again after pre-reduction and a complementary enrichment of the ore takes place, by magnetic separation at low intensity for example.

This process may be employed dry when the grains are larger than 50µ and in water when a considerable proportion of the granulometry falls below this limit. In the latter case, it is necessary to treat the concentrate two to three times.

The pre-reduced powdered ore obtained in this way contains from 3 to 25% of FeO and its inclusionnary oxide content is very low, still below 1% and may fall below 0.5% in certain cases. If a better micrographic cleanliness is desired, the elimination of inclusionnary oxides may be improved by transforming them into water soluble sodium compounds by adding to the crushed concentrated ore, before pre-reduction, some soda or sodium carbonate in a quantity of between 5 and 10 times the weight of the oxides to be eliminated, and by washing the pre-reduced ore in hot water, with the optional addition of hydrochloric acid having a pH of between 3 and 5, before the magnetic separation at low intensity takes place.

With regard to the choice of ore and of reducer used, particular attention should be paid to the content of certain impurities, more particularly sulphur and phosphorus, which should not be found in contents higher than the prevailing standard in the steel.

The sulphur may either come from the ore or from the reducer, but the content may be reduced during the reduction by hydrogen, where it forms $H_2S$, or during reduction by carbon in the rotating furnace, by adding lime and magnesium to the charge.

With regard to phosphorus, some concentration methods enable the content to be reduced, such as soda lixiviation and selective flocculation of the phosphates, the flocculant being crude or refined oil.

If the magnetic separation at low intensity has been carried out under liquid, the pre-reduced concentrate ore powder having had the oxides removed from the gangue, is thickened, filtered and dried.

A lubricant is added to the pre-reduced powdered ore, which simplifies compression and above all the ejection of the compressed matter from the compacting container. An organic stearate or a chlorinated paraffin is preferably used.

A classical sintering bond may be added to the mixture, allowing the grains to stick to each other, owing to its polymerisation and being adapted to be eliminated during heating if the sintering intervenes to increase the cohesion of the slab by diffusion among the grains. All the normal binding agents may be used, such as latexes, paraffins, collodion etc. However, methyl polymethacrylate solution in methyl chloride is advantageously used. This compound is eliminated between 100° and 450° C. The cracking of these molecules necessitates heating sufficiently slowly to permit diffusion of the gases which are eliminated as they appear, owing to the purging provided in the processing furnace.

In order to obtain an alloyed steel, pure elements, compounds such as oxides, powdered ferroalloys, having a granulometry which is equal to or less than that of the ore, are added to the above mentioned mixture. The elements of alloys recommended are essentially metals which are less oxidisable than iron, in particular, copper, nickel, molybdenum, tungsten (up to 5%), lead (up to 2%). Manganese, chrome as well as the metalloids (S, Se, Te, etc.) may also be added up to contents of 1%. All these additives have a yield of approximately 1.

In a first variation, a solid or liquid carbonised reducer which is reasonably pure and has a low ash content is also added to the mixture.

This reducer may be carbon in the form of graphite, charcoal, lamp black, or pitch, for example and, in this case, it will be introduced into the mixture in powder form. It may also be a hydrocarbon such as light fuel, domestic fuel, or heavy fuel optionally heated to 120°, this hydrocarbon preferably being free of sulphur. It may finally be a substance which is rich in carbon such as finely divided cast iron powder.

The carbonised reducer is introduced into the mixture in a proportion which corresponds to the stoichiometric quantity required for the complete reduction of reducible oxides remaining in the mixture, increased by the quantity required for obtaining the desired carbon content in the steel, taking into consideration the carbon which is already present in the ore and that which will come from the binder and from the lubricant and which will not be eliminated before reduction.

The homogeneous mixture obtained by mixing, starting from the above-mentioned components, is introduced into the container of a hydraulic press to undergo compacting designed to manufacture a solid or hollow billet. All the classical processes of powder metallurgy may be used; single or double action press, cold or warm extrusion, isotatic compression by gases or by liquids, impulsion or shock compression.

The billet obtained by compacting is introduced into a furnace where it is brought to a temperature of between 1100° and 1350° C inclusive to executed in one single operation, the final reduction of the ore, the sintering of the billet and the heating of the billet to the transformation temperature.

The reducing furnace must operate away from the air, and the gases formed during the reversible reducing reactions must be constantly eliminated. For this purpose, the furnace is maintained at over pressure and is constantly purged by a neutral gas, for example nitrogen.

The nitrogen flow is calculated in such a way that the gases evacuated from the furnace contain at least 50% nitrogen. To simplify the reaction, the nitrogen may be introduced in a counter flow to the slab. A furnace having a chamber at each end, which is purged by nitrogen, may optionally be used, and this permits the gases produced inside the furnace to be recycled and to be used for preheating the nitrogen. A billet is maintained at a temperature of the order of 1200° for at least 20 minutes or at a temperature above 1250° for 10 minutes.

In a second variation, the billet manufactured in the same conditions as previously, does not contain a reducer which has been added to the mixture apart from the only carbon (in the form of graphite for example) required for obtaining the desired carbon content in the steel, taking into consideration the carbon already contained in the pre-reduced ore. The total reduction of the oxides is carried out by a gaseous reducer in a first area of the furnace; this reducer may advantageously be hydrogen, cracked ammoniac or any other gaseous reducing mixture which is rich in hydrogen, such as reforming $CO + H_2$ gas.

The billet is heated to a temperature of between 400° and 700° C inclusive in this area, the reducing gas circulating in over pressure in a counter flow to the billet.

The reduction is complete after the billet has been kept for at least 20 minutes in this area. The billet then enters the second area of the furnace which has been purged with a neutral gas such as nitrogen, in such a way that the pressure there is maintained slightly above that in the first area, to avoid the presence of hydrogen in that part of the furnace which is designed to bring the slab to the transformation temperature.

In the two variations, the reducing furnace may either be an electrical furnace with resistance or an induction furnace which may end with a preservation and homogenisation area which is heated by electrical resistances. It may be worthwhile providing an initial slow heating of the slab up to 500° to allow the binder to be eliminated and the metal to be presintered.

In both variations a porous billet of non-oxidised, ordinary or alloyed steel is obtained at the outlet of the furnace, having a density of between 4 and 6 kg/dm$^3$. This slab comprises a multitude of small, extremely fine pores dispersed over the whole volume in a homogeneous manner. This solid or hollow billet at the temperature required for its heat transformation may be forged, rolled or extruded immediately.

It may be forged or rolled into bars, for example, starting from a billet having the shape of a round or square sectional billet, or a strip may be rolled by starting from a flat sectioned slab. In both cases a sufficiently long billet may be obtained, for example by continuous cold or warm rolling with a moderate (2 or 5) sectional reduction, from powder mixed through a die of desired section, the billet obtained undergoing, after cutting, the reduction and transformation operations.

Another recommended method consists in extruding the solid or hollow billet with a round section over a press of the desired power to obtain bars or tubes; in this case the techniques of lubrication known for hot extrusion are used, while employing graphite, sulphur, molybdenum-based lubricants or vitreous products.

In the latter case, the billet is coated with glass in such a way as to form a continuous layer which protects it against oxidation outside the furnace and reduces the stress of rubbing against tools during extrusion. In the case of the extrusion of a tube from a hollow billet the interior of the billet is also protected by introducing glass into the axial hole by means of a lengthened ladle which tips up in the hole, or by recovering the mandrel from a grease containing graphite and/or glass powder.

If glass is used to ensure lubrication, an advantageous means of operating consists in effecting the coating in the extension of the reducing furnace in a sealed, unheated area which is purged by the atmosphere of the furnace. This area comprises an inclined lead plate where the glass coating is applied and, in the case of a tube, where the glass is introduced into the axial hole at the outlet of the hot zone, by an automatic retractable ladle being previously filled outside the furnace.

In this way, either bars of any shape (flat, hexagonal, square, etc.,) or tubes are obtained, these products being able to attain lengths of approximately 100 meters. The bars may be rolled into wires and the tubes may be rolled on a drawing-reducing rolling mill, these operations taking place in the heat of extrusion.

The process according to the invention enables the extruded products, which are of comparable quality and presentation to normal wrought products, to be obtained, which have the same properties once the reduction rate applied to the slab is above 10. Ordinary steels as well as alloyed steels may be manufactured in this way. In addition, these steels have a very low silicon content, giving them good properties of ductility.

The invention will be better understood by the five Examples below, which only constitute particular non-limitative embodiment.

EXAMPLE 1

Swedish superconcentrated magnetite ore having the following analysis, in percentages, is used as starting material:

$Fe_3O_4 = 95.2$; $Fe_2O_3 = 2.5$; $SiO_2 = 0.9$; $Al_2O_3 = 0.50$;

$MgO = 0.35$; $TiO_2 = 0.25$; $S = 0.010$; $P_2O_5 = 0.02$.

This ore has been crushed fine to the liberating mesh, its granulometry being between 30 and 100 μ, inclusive. It is made into pellets and treated in a classical pre-reducing installation comprising a shaft furnace, the reducing gas $CO + H_2$ being obtained by reforming the natural gas. Pre-reduced pellets are obtained whose metallisation rate is an average of 88%. The pellets are crushed in ball crushers to give a powder having a granulometry of between 20 and 90 μ. A magnetic separating operation at low intensity is applied to the fine crush after reduction, carried out in water and applied twice consecutively. The powder obtained has the following analysis (in percentage):

$C = 1.17$; $Fe = 83.8$; $FeO = 14.7$; $SiO_2 = 0.08$;
$Al_2O_3 = 0.05$; $MgO = 0.07$; $TiO_2 = 0.05$; $S = 0.008$;
$P = 0.01$.

This powder is mixed with the following additives (percentage by weight of ore) so as to obtain a homogeneous product
- an organic stearate lubricant (0.75%)
- a methyl polymethacrylate binder (1.5%)
- graphite (1.63%)
- the quantity of graphite is determined in the following manner:
- reducing carbon for 3.3% of $O_2$ bound to the iron . . 2.48%
- analysis carbon of the steel 0.3% × 0.967 . . . 0.29%
- C requirements . . . 2.77%
- Carbon present . . . 1.17%
- Carbon required . . . 1.60%

The carbon of the binder and the lubricant is entirely eliminated before reduction.

The graphite containing 99% of C and, taking into consideration a yield of 99%, 1.63% of graphite is thus added.

The mixture obtained is poured into the container of a hydraulic compacting press in which a solid billet is manufactured by compression at 50 kg/mm$^2$. The dimensions of the billet obtained in this way are: diameter 225 mm - length: 1000 mm. The density is 5.85 and the weight 230 kg.

This billet is introduced into a preheating furnace at 500° C where it is brought to temperature within approximately 1 hour, this operation having the object of bringing about the pre-sintering and of eliminating the binder. It is then introduced into an electrical furnace with spars comprising tubes radiating up to 1100° C and silicon carbide battens beyond. It is brought to 1300° in 1½ hours, the time spent above 1200° being 25 minutes. The furnace is purged with a nitrogen flow in such a way that the gases which leave the furnace at over pressure contain substantially 40% of CO and 60% $N_2$. Upon leaving the furnace, in an extension of the latter within a non-heated but gas purged area, the billet rolls on an inclined bed plate covered with glass powder. When leaving the furnace it falls into the V of a manipulator which places it opposite the 3,000 T extrusion press container. The extrusion operation is accomplished in less than 10 seconds, the billet being successively compressed in the container and extruded. In this way, it has been possible to obtain bars having a diameter from 25 to 60 mm, with a maximum length of 100 meters.

The analysis of the steel obtained was within the following range (in percentage):
C = 0.29 ± 0.03; S = 0.012 ± 0.03; P = 0.010 ± 0.05.

The properties of this steel conform to the prevailing standards for carbon steels in this analysis.

The following was found on samples taken from a 16 mm forged square from an extruded round of 25 mm:
in the normalised state from 870°, slow cooling:
Tensile strength (R): 54 kg/mm$^2$
Elongation (A) (on 5 D): 30%
Resilience (KCU): 8 daJ/cm$^2$
in the treated state:
Water tempering 850° + drawing 550° C
Tensile strength (R): 77 kg/mm$^2$
Yield strength (E): 57 kg/mm$^2$
Elongation (A) (over 5D): 16%
Resilience (KCU): 8.5 daJ/cm$^2$

EXAMPLE 2

Starting from the same ore as in the previous Example, which has undergone the same crushing, pelleting, pre-reducing and enriching operations.

The following additives are added to this powder before mixing (in percentage by weight of ore)
a lubricant as above,
nickel oxide (NiO), ferromolybdenum and ferromanganese, in quantities calculated to bring to the steel 2% of Ni, 0.25% of Mo, and 0.5% of Mn, while giving a yield of 100%. These additives are effected in the form of powder with a very fine granulometry < 50 $\mu$.
graphite, 1.94%
The quantity of graphite is determined in the following manner:
reducing carbon for 3.3% of O$_2$ bound to the iron . . . 2.48%
reducing NiO carbon . . . 0.40%
analysis carbon of steel (0.20 × 0.967) . . . 0.19%
requirements in C . . . 3.07%
carbon present . . . 1.17%
carbon required . . . 1.90%
This gives 1.94% (yield (R): 99% — carbon content of graphite 99%).

The mixture obtained is poured into the container of a hydraulic compacting press in which a hollow billet is formed by the presence of a mandrel in the container. The billet obtained by compacting at 45 kg/mm$^2$ has the following dimensions:
external diameter: 225 mm
internal diameter: 80 mm
length: 900 mm
The density is 5.9 and the weight of the billet is 1.85 kg. This billet is heated to 1270° under the same conditions as the previous Examples.

When the billet leaves the furnace, external lubrication with glass takes place but, before rolling the billet towards the press inside the coating area under atmosphere, the glass required for the internal protection is introduced into the hole by a ladle which has been prepared in advance.

The metal is extruded on a press of 3000 t whose punch is equipped with a mandrel having the same diameter as the internal diameter of the tube under heat. Tubes are manufactured with an external diameter of 90 mm, a width of 11 mm and tubes with an external diameter of 100 mm and a thickness of 16 mm with respective lengths of 10.6 m and 8 m.

The metal analysis obtained on the tubes was centred on the analysis shown (in percentage):
C = 0.20 ± 0.02; Mn = 0.15 ± 0.03; Ni = 2 ± 0.1; Mo = 0.25 + 0.03.

These tubes may be used for the manufacture of cemented bearings. They conform to the specifications imposed by the suppliers and have, particularly, a good micrographic texture (the visible inclusions being extremely fine and well distributed). It should be noted that this metal has a fine grain (>8 ASTM), a property which cannot be obtained in the classical method except with aluminium additives.

EXAMPLE 3

A super-concentrate from Brazil, itabirite, which is a hematite ore with a free liberation (grains of 30 to 100 $\mu$) and which has been particularly enriched by magnetic separation at high intensity carried out under water, after screening, passing the cyclone and classification, is used as a starting material.

The analysis of this super-concentrate was the following (in percentage):
Fe$_2$O$_3$ = 96.5; SiO$_2$ = 2.4; Al$_2$O$_3$ = 0.6; other oxides=0.5%; S = 0.016; P = 0.020.

This ore is transformed into pellets by treatment on a pelleting plate and is subjected to a pre-reduction in a shaft furnace giving a metallisation of 90%. These pellets are passed to the autogeneous crusher and to the ball crusher to obtain fines which are identical to the initial fines and are subjected, after classification, to a magnetic separation at low intensity, the treatment being repeated twice. The analysis of the products obtained after drying is the following (in percentage):
C = 1.65; Fe = 85.4; FeO = 12.2; SiO$_2$= 0.3; Al$_2$O$_3$ = 0.2; Other oxides = 0.5%.

This powder is mixed with the following additives (in percentage of ore):
a lubricant (organic stearate ACRAWAX) 0.75%
nickel oxide, ferro molybdenum and ferro manganese in quantities calculated to bring 2% of Ni, 0.25% of Mo and 0.15% of Mn to the steel while producing a yield of 100%. These additives are applied in the form of extremely fine powders (< 80 $\mu$),
heavy fuel (88% C — 11% H$_2$ — very low S) introduced in the mixture after preheating to 120° C.

The quantity of fuel required is calculated in the following manner:
carbon for reducing FeO . . . 2.03%
carbon for reducing NiO . . . 0.40%
analysis carbon of steel (0.20 × 0.983) . . . 0.20%
Carbon requirements . . . 2.63%
Carbon present . . . 1.65%
Carbon required . . . 0.98%
With the yield obtained and considering that the hydrogen acts as six times the carbon in the fuel, it is found that:
fuel requirements: 1/1.54 = 0.64%

A solid compacted billet is manufactured with this powder, as in Example 1, having the following dimensions: diameter 225 mm, length 1000 mm, weight 229 kg ($d = 5.8$).

This billet is introduced into an induction furnace comprising three coils in series which bring it to 1250° in 30 minutes approximately. The billet is then introduced into a homogenisation furnace where it is maintained at 1250° C for 10 minutes. The heating assembly is purged with a nitrogen flow at over pressure. The exit of the billet towards the press takes place on a classical glass-coating table, the billet being rolled in glass fibre. The metal is extruded into a bar of 19 mm diameter, 100 m length approximately by using a zirconia die. After leaving the press, the bar is rapidly introduced into a wire rolling mill comprising 12 cages in series inclined alternately by 90% to each other. Wire coils of 5.5 mm diameter may be obtained. The temperature of the bar upon entry into the roller is between 950° and 1050° C inclusive. The glass and the scale are removed by water under pressure before it enters the wire rolling mill.

The wire obtained is completely comparable to the wire of the same analysis manufactured by classical methods, both from the appearance point of view and from the point of view of mechanical properties. The analysis is:

C = 0.22; Ni = 2.02; Mn = 0.14; Mo = 0.26.

The tests carried out on samples from the bars of 19 mm diameter before rolling showed the following characteristics after oil tempering at 900° + drawing at 200° C:

Tensile strength (R): 137 kg/mm$^2$
Yield strength (E): 118 kg/mm$^2$
Elongation (A): 9%
Striction (S): 52%
Charpy resilience (C): 2.5 daJ/cm$^2$ Similar tests carried out on a 16 mm square forged from an ingot of the same analysis gave:

Tensile strength (R): 135 kg/mm$^2$
Yield strength (E): 115 kg/mm$^2$
Elongation (A): 10%
Striction (S): 58%
Charpy resilience (C): 3 daJ/cm$^2$ The fatigue tests carried out on the two comparative steels gave:

steel according to the invention: 78 kg/mm$^2$ ± 3
classical steel: 76 kg/mm$^2$ ± 5

EXAMPLE 4

An Australian hematite ore is used as a starting substance and has a separating mesh corresponding to 150 μ and an analysis of, in percentage:

$Fe_2O_3$ = 94.7; $SiO_2$ = 3.2; CaO = 0.03; $Al_2O_3$ = 1.14; $TiO_2$ = 0.015; MgO = 0.63; P = 0.019; Mn = 0.154; S = 0.042.

This ore, after treatment in the ball crusher to obtain a granulometry of 50 to 150 μ is transformed into pellets on a pelleting plate. These pellets are treated in a rotating furnace operating at 1050°, using a mixture of 80% of anthracite and 20% of lignite. 2% of the lime charge is added with the reducer.

The ore is reduced with a metallisation rate of 92%. The pellets are crushed to the starting granulometry (50 to 150 μ) and subjected to a magnetic separation at low intensity, dry. An ore with the following average analysis is obtained (in percentage):

C = 0.32; Fe = 88.7; FeO = 10; $SiO_2$ = 0.24; $Al_2O_3$ = 0.15; MgO = 0.1; Mn = 0.21; S = 0.010; P = 0.027.

This powder is mixed in a homogeneous manner in a mixer with the following products:

a lubricant: chlorinated paraffin: 1%
graphite: 0.47%

The quantity required is calculated in the following manner:

analysis carbon of the steel (0.8 × 0.978) . . . 0.78%
Carbon present . . . 0.32%
Carbon required . . . 0.46% that is 0.47% taking into consideration a yield of 98%.

A solid billet of 225 mm diameter and 1000 mm length and of 230 kg weight is manufactured with this powder. This billet is heated in a resistance furnace comprising two successive heating zones. The billet is brought to 600° C in 1 hour in the first area, the residing time at 600° C being of the order of 30 minutes. This area is purged in the counter-direction of the billet by a flow of hydrogen, an overpressure of 15 mm of water of water approximately being maintained in relation to atmospheric pressure. The billet is brought to 1230° in the second zone, the traversing time being equal to 1 hour and the residing time at the maximum temperature being 15 minutes. This area is filled with nitrogen, introduced into the centre of the area and maintained at an over pressure of 25 mm of water approximately in relation to atmospheric pressure.

After leaving the furnace, the billet is coated with glass and extruded to give a bar of 19 mm diameter which is immediately introduced into a wire rolling mill comprising 12 cages in series, to obtain a wire of 5.5 mm diameter. The analysis obtained is:

C = 0.82 ± 0.05; S = 0.010; P = 0.030.

EXAMPLE 5

Starting from the same base as in Example 1, the successive operations which are described therein are followed to obtain the same soft mixture. This mixture is introduced in the container of a vertical hydraulic press of 3000t using a container of 200 mm diameter, the die allowing the manufacture of a 120 mm square section with rounded corners. After each to and fro movement of the piston of the press, the piston steps in the raised position to allow a given quantity of mixed powder to be introduced into the container, this powder being introduced through a lateral opening which is connected to the cylinder of a horizontal supply press. The powder mixture is brought through the cylinder by a long piston which makes successive to and fro movements, each movement assuring the successive opening and closing of a supply silo situated vertically above the cylinder and opening into the latter.

In this way, the continuous extrusion of a compacted powder billet having the form of a billet of square section with rounded corners and which can be cut to the desired length is obtained by the combined movement of the main piston and the supply piston.

This pellet of 4 meters length weighing 330 kg is introduced into a furnace with spars which brings it to 1250° C while maintaining this temperature for 10 minutes. On leaving the furnace, the pellet immediately enters the cylinders of a classical continuous rolling mill comprising firstly 6 shingling cages which are alternately horizontal and vertical and which operate according to a "square-diamond" descent, the 4 first passes giving low faggoting rates and not being sprayed. Beyond the 6th cage, an "oval-round" descent is used on the 23 following cages of which 13 cages are alternately horizontal and vertical with buckles from the 10th cage of the rolling mill, the 10 last cages being those of a carbide roller block. Coiled, round wire is thus obtained at final rolling speeds of from 40 to 60 m/second with dimensions of from 5.5 to 12 mm diameter.

I claim:

1. Process for the manufacture of steel products from an enriched ore without passing through the liquid phase comprising the steps of:
   (1) forming a concentrated iron ore by crushing an enriched iron ore, pre-reducing the crushed ore, crushing the pre-reduced ore to a granulometry less than or equal to that of the ore before pre-reduction and magnetically enriching the ore,
   (2) forming a billet from a mixture of (a) a concentrated iron ore in powder form having a non-reducible oxide content below 1% by weight (b) a lubricant and (c) a carbonized reducing agent,
   (3) compacting the billet,
   (4) heating the compacted billet under a non-oxidizing atmosphere at a temperature from 1100° to 1350° C to reduce the ore and form a non-oxidized porous steel billet, and
   (5) working the hot billet to form the steel product.

2. Process according to claim 1 wherein the billet is worked by extrusion, rolling or forging.

3. Process according to claim 1 wherein the mixture also includes a binder.

4. Process according to claim 1 wherein the lubricant mixed with the ore is an organic stearate or a chlorinated paraffin.

5. Process according to claim 3 wherein the binder is methyl polymethacrylate in solution in methyl chloride.

6. Process according to claim 1 wherein the mixture includes additives selected from the group consisting of Cu, Ni, Mo, W, Pb, Se, Te, the compounds and ferro-alloys of these elements in powder form, having a granulometry less than or equal to that of the ore are added to the mixture to give the metal the desired elements.

7. Process according to claim 1 wherein the carbonized reducer added to the mixture is powdered carbon in the form of graphite, lamp black or pitch.

8. Process according to claim 1 wherein the carbonized reducer is a hydrocarbon.

9. Process according to claim 1 wherein the carbonized reducer is added to the mixture in a quantity which corresponds to the stoichiometric reduction of the reducinle oxides remaining in the mixture, increased by the quantity corresponding to the desired carbon content in the steel and reduced by the quantity corresponding to the carbon content of the ore of the mixture.

10. Process according to claim 1 wherein the reducer used for the complete reduction includes a gas rich in hydrogen and which circulates at over pressure against the flow of the billet in a first area of a reducing furnace at a temperature of between 400° C and 700° C, inclusive, and that the carbonized reducer added to the mixture brings just the carbon required for obtaining the desired carbon content in the steel, decreased by the carbon content of the ore of the mixture.

11. Process according to claim 10 wherein the reduction furnace comprises a second heating area at a temperature of between 1100° and 1350° C, inclusive, where a non-oxidizing gas circulates at a pressure which is slightly above that of the reducing gas pressure in the first area.

* * * * *